United States Patent
Rongve

(10) Patent No.: US 8,519,664 B2
(45) Date of Patent: Aug. 27, 2013

(54) METHOD FOR CONTROLLING A MACHINE OR AN ELECTRICAL LOAD SUPPLIED WITH ELECTRIC POWER OVER A LONG LINE

(75) Inventor: Knut Rongve, Fyllingsdalen (NO)

(73) Assignee: ABB AS (NO)

( * ) Notice: Subject to any disclaimer, the term of this patent is extended or adjusted under 35 U.S.C. 154(b) by 0 days.

(21) Appl. No.: 13/569,909

(22) Filed: Aug. 8, 2012

(65) Prior Publication Data

US 2012/0319628 A1 Dec. 20, 2012

Related U.S. Application Data

(63) Continuation of application No. PCT/EP2010/051488, filed on Feb. 8, 2010.

(51) Int. Cl.
*H02G 9/00* (2006.01)

(52) U.S. Cl.
USPC .......... 318/813; 318/558; 174/68.1; 323/207; 324/539

(58) Field of Classification Search
USPC ............. 318/558, 812, 813; 323/205, 207; 324/539; 361/268; 174/37, 68.1
See application file for complete search history.

(56) References Cited

U.S. PATENT DOCUMENTS

| | | | |
|---|---|---|---|
| 3,500,132 A * | 3/1970 | Garrett | 361/186 |
| 3,590,368 A * | 6/1971 | Esclangon | 324/543 |
| 4,731,688 A | 3/1988 | Nimmersjo et al. | |
| 5,438,502 A | 8/1995 | Rozman et al. | |
| 5,543,995 A * | 8/1996 | Kumagai et al. | 361/65 |
| 5,610,501 A * | 3/1997 | Nelson et al. | 323/207 |
| 5,754,035 A * | 5/1998 | Sen | 323/207 |
| 5,959,855 A | 9/1999 | Ishii et al. | |
| 6,720,753 B2 | 4/2004 | Kikuchi et al. | |
| 7,365,511 B2 | 4/2008 | Nguyen | |
| 2007/0124093 A1 | 5/2007 | Choi et al. | |
| 2009/0256519 A1 | 10/2009 | Yohanan et al. | |

FOREIGN PATENT DOCUMENTS

| | | |
|---|---|---|
| JP | 63314134 A | 12/1988 |
| JP | 5122806 A | 5/1993 |

OTHER PUBLICATIONS

International Preliminary Report on Patentability; Application No. PCT/EP2010/051488; Issued: Apr. 3, 2012; 16 pages.
International Search Report and Written Opinion of the International Searching Authority; Application No. PCT/EP2010/051488; Issued: Oct. 6, 2010; Mailing Date: Ocotber 19, 2010; 12 pages.
Wu, et al.; "Studies of Commercial Converter in Wound Rotor Brushless Doubly-fed Marine Generator Control System"; Electrical Machines and Systems, Oct. 2008; pp. 2507-2511.

* cited by examiner

*Primary Examiner* — Bentsu Ro
(74) *Attorney, Agent, or Firm* — St. Onge Steward Johnston & Reens LLC

(57) ABSTRACT

A drive controller arranged to provide electrical power from a power supply to a machine or load over a long AC power cable of the order of kilometers. The drive controller is arranged with circuits and/or control processes to provide AC current at a constant ratio of voltage and frequency to said machine or load. The drive controller maintains voltage and frequency at the machine terminals despite fluctuations in voltage and/or frequency that would ordinarily be caused by the load. This is done by estimating the voltage and current at the machine terminals and adapting the drive controller output accordingly to actively vary the converter output dependent on the load of the machine or other load. In other aspects of the invention a method and a computer program for carrying out the method are described.

17 Claims, 2 Drawing Sheets

METHOD FOR CONTROLLING A MACHINE OR AN ELECTRICAL LOAD SUPPLIED WITH ELECTRIC POWER OVER A LONG LINE

CROSS-REFERENCE TO RELATED APPLICATIONS

The present application is a continuation of pending International patent application PCT/EP2010/051488 filed on Feb. 8, 2010 which designates the United States and the content of which is incorporated herein by reference.

FIELD OF THE INVENTION

The present invention is concerned with a method for controlling an electrical load or machine which is supplied with AC power over a long line. The load or machine may be supplied by motor controller such as a variable frequency power source, a variable frequency power inverter or converter. It is particular advantageous when used to control an electrical load or machine in an installation for production, distribution and/or processing in the industry of Oil and Gas.

BACKGROUND OF THE INVENTION

When feeding AC power through long cables in transmission systems feeding an electrical load (machines/or other loads), the voltage at consumer end will be heavily influenced by electrical load drawn by the consumer. An example of such a long cable is a cable some kilometers in length connecting a power supply on land to a transformer or to a motor of a pump installed out to sea. In the field of Oil and Gas exploration and production, such loads or machines may be for example be mounted on the seabed tens of kilometers away from land or a topside platform. Electrical equipment such as a subsea multiphase pump or pressure booster pump or a subsea compressor used in Oil and Gas production or transfer installations may be operated underwater, eg on the seabed, at depths 1000 meters, or more.

When a power cable becomes very long and/or frequency becomes high, the voltage becomes even more dependent on the electrical load drawn by the consumer or consuming unit, and at a point it is not possible to keep the voltage within acceptable limits without doing active actions, examples of which may be:

1. Active control of the voltage at the motor terminals by using measured motor voltage feedback with regulation of voltage at sending end of the cable;

2. Control of reactive power by means of adding reactors at the sending end, or receiving end, Static Var compensation (fast-acting reactive power compensation), or similar equipment.

One solution would be to measure the voltage in the transmission end, ie at the load end, and use this as feedback for closed-loop control of the voltage. However, this may become a challenging and more costly solution especially for subsea systems, since this will the lead to additional equipment being installed subsea. Another technical challenge is additional penetration of subsea equipment and measurement transfer link the converter control system. Water penetration at sea and water pressure at subsea depths are added technical issues. This type of solution may thus create technical challenges and questions with relation to reliability of the system in case of component failure.

JP5122806 describes a method for controlling a linear synchronous motor for a railroad vehicle. The method includes calculating a correction for voltage drop due to vehicle position along a length of feeder line.

US2009/0256519 discloses a method and program for cable loss compensation in an electrical submersible pump system. This document discloses a submersible electrically driven pump in a wellbore. The pump is supplied by a voltage controller, which communicates with a current sensor, and which adjusts the power source output using sensor measurements to calculate a voltage drop as the product of current and cable impedance.

SUMMARY OF THE INVENTION

The aim of the present invention is to remedy one or more of the above mentioned problems. This and other aims are obtained by a method for controlling a machine or an electrical load supplied by a drive controller over a long AC power cable.

According to a first aspect of the invention a method is disclosed for controlling a machine or an electrical load supplied by a variable speed drive controller over a long AC power cable, in which method said variable speed drive controller is operated to provide AC current to said load or machine at a substantially constant ratio of voltage and frequency by obtaining an estimate or measurement of a current and voltage (Vconv) output in said drive controller, said method comprising calculating an estimated voltage (Vm_est) at the terminals of said machine or electrical load and adding a difference between the estimate and the output to control the drive controller to provide said constant ratio of voltage and frequency at the terminals of said load or machine based on the estimated voltage at the terminals.

According to an embodiment of the invention, a method is provided for controlling a machine or an electrical load supplied by a variable speed drive controller over a long AC power cable, in which method an estimated voltage (Vm_est) at the terminals of said machine or electrical load is calculated or modelled and a difference between the estimate and the output added to control the variable speed drive controller to provide a substantially constant ratio of voltage and frequency at the terminals, of said load or machine based on the estimated voltage at the terminals said method also comprising calculating the estimated current and voltage output in said drive controller based on a converter internal voltage reference to modulator as reference for dq transformation.

According to another embodiment of the invention, a method is provided for controlling a machine or an electrical load supplied by a drive controller over a long AC power cable, in said method said drive controller is operated to provide AC current to said load or machine at a substantially constant ratio of voltage and frequency said method comprising calculating or modelling an estimated voltage (Vm_est) at the terminals of said machine or electrical load and adding a difference between the estimate and the output to control the drive controller to provide said constant ratio of voltage and frequency at the terminals of said load or machine based on the estimated voltage at the terminals, said method further comprising providing the difference between the voltage estimate (Vm_est) and the voltage output (Vconv) to an add-on voltage controller arranged for controlling the variable speed drive controller and compensating for the difference thus providing said constant ratio of voltage and frequency at the terminals of said machine or electrical load.

According to another embodiment of the invention, a method is provided for controlling a machine or an electrical load supplied by a variable speed drive controller over a long AC power cable, in which method an estimated voltage (Vm_est) at the terminals of said machine or electrical load is calculated and a difference between the estimate and the output added to control the variable speed drive controller to provide a substantially constant ratio of voltage and frequency at the terminals of said load or machine based on the estimated voltage at the terminals, said method also comprising calculating an estimated voltage (Vm_est) and estimated current at the terminals at said machine or electrical load and providing one or more estimates of current at the machine terminals to a monitoring or control process of the variable speed drive controller.

According to an embodiment of the invention, a method is provided for controlling a machine or an electrical load supplied by a variable speed drive controller over a long AC power cable, in which method an estimated voltage (Vm_est) at the terminals of said machine or electrical load is calculated and a difference between the estimate and the output added to control the variable speed drive controller to provide a substantially constant ratio of voltage and frequency at the terminals of said load or machine based on the estimated voltage at the terminals, said method also comprising calculating one or more estimates of current at the machine terminals and comparing the estimated current values with predetermined current limits for the purpose of providing thermal protection of the machine or electrical load.

According to an embodiment of the invention, a method is provided for controlling a machine or an electrical load supplied by a variable speed drive controller over a long AC power cable, in which method an estimated voltage (Vm_est) at the terminals of said machine or electrical load is calculated and a difference between the estimate and the output added to control the drive controller to provide a substantially constant ratio of voltage and frequency at the terminals of said load or machine based on the estimated voltage at the terminals, said method also comprising calculating one or more estimates of current at the machine terminals and comparing the estimated current values with predetermined current limits and providing data dependent on the comparison to a control process of said drive controller for the purpose of providing thermal protection of the machine or electrical load.

During development for a subsea Oil and Gas project in the North Sea off the coast of Norway the inventor has developed a solution to the above problems among others. In one embodiment, the solution involves estimating or calculating voltage and current at the machine terminals (load end) by using converter internal calculated and measured output voltage and current. This estimated voltage at the machine terminals is used as feedback to an add-on voltage controller in the converter to control the converter output voltage so as to obtain a constant ratio of voltage/frequency at the motor terminals. This solution needs no data about the machine and can also be used for other electrical loads, since the load is not part of the calculation.

The algorithm or model uses the converter internal voltage reference to modulator as reference for dq transformation. The dq components of the converter output current are then calculated and filtered since filtering of dq components (DC signals) will not create a phase shift.

The motor voltage and current calculator may be parameterized with electrical data from any step-up and/or step-down transformers and the cable, as will be described in more detail in the following sections.

According to another aspect of the invention, a power supply in the form of a variable speed controller is provided which is arranged to provide electrical power from a power supply to a machine or an electrical load, which power is supplied by said variable speed drive controller over a long AC power cable wherein AC current is provided at a substantially constant ratio of voltage and frequency to said machine or electrical load, said variable speed drive controller is arranged with an estimator circuit for estimating and/or measuring a current and voltage (Vconv) output in said drive controller, characterized in that said drive controller comprises a calculating circuit for calculating an estimated value for voltage at the terminals of said machine or electrical load, and a comparison circuit for comparing voltage output (Vconv) with estimated voltage (Vm_est) at the machine terminals to identify any difference, wherein said variable speed drive controller is further adapted to carry out a compensation for the difference and control the controller output to provide said constant ratio of voltage and frequency at the terminals of said machine or electrical load based on the estimated voltage (Vm_est) at the terminals.

According to an embodiment of the invention, a power supply in the form of a variable speed controller is provided which is arranged to provide electrical power from a power supply to a machine or an electrical load, said variable speed drive controller is arranged with an estimator circuit for modelling and/or measuring a current and voltage (Vconv) output in said drive controller, said drive controller comprises a calculating circuit for calculating an estimated value for voltage at the terminals of said machine or electrical load, and a comparison circuit for comparing voltage output (Vconv) with estimated voltage (Vm_est) at the machine terminals to identify any difference, wherein said estimator circuit for calculating an estimated current and voltage output in said drive controller uses a converter internal voltage reference to modulator as reference for dq transformation.

According to another embodiment of the invention, a power supply in the form of a variable speed controller is provided which is arranged to provide electrical power from a power supply to a machine or an electrical load, which power is supplied at a substantially constant ratio of voltage and frequency to said machine or electrical load, said variable speed drive controller is arranged with an estimator circuit for estimating and/or measuring a current and voltage (Vconv) output in said drive controller, said drive controller comprises a calculating circuit for calculating an estimated value for voltage at the terminals of said machine or electrical load, and a comparison circuit for comparing voltage output (Vconv) with estimated voltage (Vm_est) at the machine terminals to identify any difference, wherein an add-on voltage controller is provided with the difference between the output voltage (Vcon) in said drive controller and the estimated voltage (Vm_est) at the terminals and arranged for controlling the drive controller based on any difference between, thus providing said constant ratio of voltage and frequency at the terminals of said machine or electrical load.

According to another embodiment of the invention, a power supply in the form of a variable speed controller is provided which is arranged to provide electrical power from a power supply to a machine or an electrical load at a substantially constant ratio of voltage and frequency to said machine or electrical load, said variable speed drive controller is arranged with an estimator circuit for estimating and/or measuring a current and voltage (Vconv) output in said drive controller, wherein said drive controller comprises a calculating circuit for calculating an estimated value for voltage at the terminals of said machine or electrical load, and a comparison circuit for comparing voltage output (Vconv) with estimated voltage (Vm_est) at the machine terminals to identify any difference, wherein said estimator circuit or process for calculating an estimated voltage (Vm_est) and current at the terminals of said machine or electrical load is arranged to provide one or more estimates of current at the machine terminals to a control or monitoring process of said drive controller.

According to another embodiment of the invention, a power supply in the form of a variable speed controller is provided which is arranged to provide electrical power from a power supply to a machine or an electrical load at a substantially constant ratio of voltage and frequency to said machine or electrical load, said variable speed drive controller is arranged with an estimator circuit for estimating and/or measuring a current and voltage (Vconv) output in said drive controller, wherein said drive controller comprises a calculating circuit for calculating an estimated value for voltage at the terminals of said machine or electrical load, and a comparison circuit for comparing voltage output (Vconv) with estimated voltage (Vm_est) at the machine terminals to identify any difference, wherein said variable speed drive controller comprises an estimator circuit or process for calculating one or more estimates of current at the machine terminals and providing the estimates to a process in said drive controller for comparing one or more values for current with predetermined current limits for the purpose of providing thermal protection of the machine or electrical load.

A computer program, a computer program stored in a memory storage device, and a computer program recorded on a computer-readable medium, which program is suitable for use with a processing unit having an internal memory in which the computer program or computer program product comprising software code portions may be loaded therein, is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

Figure 2:
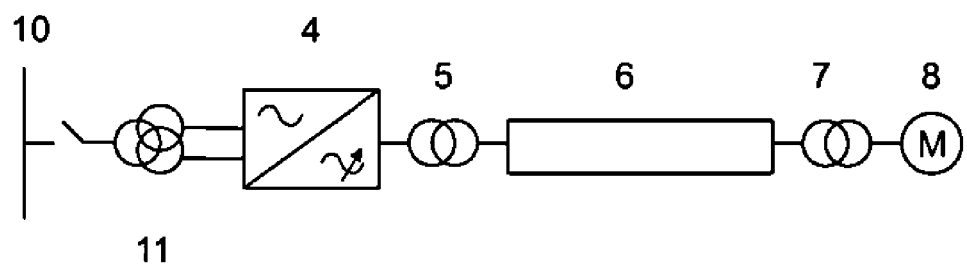
FIG. 2 shows the invention of FIG. 1 and in particular a schematic for an electrical circuit with which the method of the invention is practised according to an embodiment of the invention.

FIG. 2 shows a schematic diagram of the principal electrical components involved in practising one embodiment of the invention. It shows, from left to right, a power supply 10, an input transformer 11, a variable frequency power converter/inverter or converter 4, and a transformer 5 which is a step-up transformer. Transformer 5 is connected to a long power supply line or cable 6 operated in this exemplary example at a high voltage of 40 kV or more. The long high voltage power line 6 is further connected to a transformer 7, in this case a step down transformer, and transformer 7 is thereafter connected to a machine 8 or an electrical consuming load running in this example in the range 4-6 kV.

To summarise, power is supplied to a power converter/inverter, which may also be described as a variable speed drive, which provides AC power stepped up in a first transformer 5 at the converter end, applied at high voltage over long line 6, stepped down in a second transformer 7 at the machine end, and supplied to the machine 8.

The method may be practised by calculating what the voltage will be at the machine terminals as it varies dependent on the load of the machine 8 or other electrical load. A simplified model of the circuit may be used to calculate (estimate) the voltage at the machine end. A compensation is then applied to the drive controller output to compensate for any estimated deviation of the voltage at the machine terminals due to variation in load.

Figure 1:
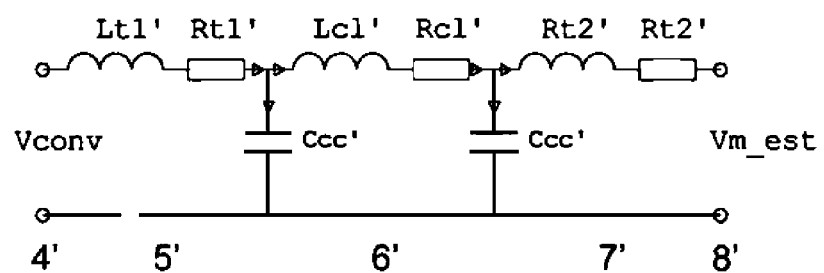
FIG. 1 shows a schematic diagram a model of a circuit used in a method to calculate voltage at the machine terminals according to an embodiment of the invention.

FIG. 1 shows a simplified load flow model for a motor controller connected over a long line supplying AC power to a machine or load. The figure shows, from left to right, the voltage in the converter Vconv, and the resistance/inductance characteristics of the step up transformer 5. The second part of the diagram model shows capacitance/resistance/inductance characteristics of the long cable 6. At the right side of the model is shown the resistance/inductance characteristics of the step down transformer 7 and the position of the estimated voltage Vm_est at the machine 8 end of the model. The variables shown are:

Rt1=Step-up transformer resistance (per unit)
Lt1=Step-up transformer inductance (pu)
Ccc=Cable reactance/2 (pu)
Rcl=Cable reactance (pu)
Lcl=Cable inductance (pu)
Rt2=Step-down transformer resistance (pu)
Lt2=Step-down transformer inductance (pu)

The simplified load flow model is preferably calculated every 1 ms and voltage calculated is then used to create actual feedback for compensation by way of a voltage add-on controller of the motor controller 4, also described as a drive controller.

Simulations, calculations and tests carried out with small-scale and full scale test set-ups and on-site installations have shown promising results regarding the performance of the voltage add-on controller and voltage estimator. The dimensions used in the calculations and the tests are for a power converter which is planned to supply a load via an undersea cable at a distance of nearly 50 kilometers from land. In one example the power supply is intended for a subsea compressor for an oil and gas installation. In general such a long line or cable can supply subsea equipment placed on a seabed at depths up to 3,000 meters. Subsea machines such as a multiphase pump are required to run continuously for months or years at a time. Such pumps or compressors typically handle mixtures of petroleum oil substances. The density of the mixtures of petroleum and oil substances also may change in an unpredictable way, causing unpredictable changes in the load on the pump or other machine.

The solution described here has the advantage that there may be no need for actual measured voltage feedback in a long step-out system with long step-out cables. This solution may also prevent a need for a reactor at the subsea end in some applications with very long cables where voltage stability due to Ferranti effect would otherwise be regarded as an issue.

The following formulas may be applied in the drive controller, the variable speed drive or converter 4:

Calculations in dq coordinates (d-axis aligned to converter voltage vector)

Id=current component in phase with converter voltage (d-axis)

Iq=current component 90 degree with converter voltage (q-axis)

Calculations of the dq coordinates:
Step up transformer 5
Step-up transformer output dq-voltage:

$$Ut1d=Ucd-Icd*Rt1+Icq*w*Lt1$$

$$Ut1q=Ucq-Icq*Rt1-Icd*w*Lt1$$

Cable capacitance leakage dq-current flowing through Ccc at cable at converter side;

$$I2d=-Ut1q*w*Ccc$$

$$I2q=Ut1d*w*Ccc$$

dq-Current flowing through Lc1 and Lc1 in cable model $$I3d=Icd-I2d$$

$$I3q=Icq-I2q$$

Step down transformer 7:
Step down transformer dq-voltage $$Ut2d=Ut1d-I3d*Rcl+I3q*w*Lcl$$

$$Ut2q=Ut1q-I3q*Rcl-I3d*w*Lcl$$

Cable capacitance leakage dq-current flowing through Ccc at cable at electrical load side;

$$I4d=-Ut2q*w*Ccc$$

$$I4q=Ut2d*w*Ccc$$

Motor or electrical load dq-current $$I5x=I3x-I4x$$

$$I5y=I3y-I4y$$

Voltage and current at machine 8
Motor or electrical load dq voltage $$Umd=Ut2d-I5d*Rt2+I5q*w*Lt2$$

$$Umq=Ut2q-I5q*Rt2-I5d*w*Lt2;$$

Motor or electrical load absolute voltage vector $$Um\_abs=(sqrt((Umx^2)+(Umy^2)))*sqrt(3)$$

Motor or electrical load absolute current vector $$Im\_abs=sqrt((I5x^2)+(I5y^2))$$

where
Ucd=(d-axis component of the converter voltage per unit)
Icd=(d-axis component of the converter current per unit)
Icq=(q-axis component of the converter current per unit)
w=(actual output electrical frequency per unit)

Figure 3:
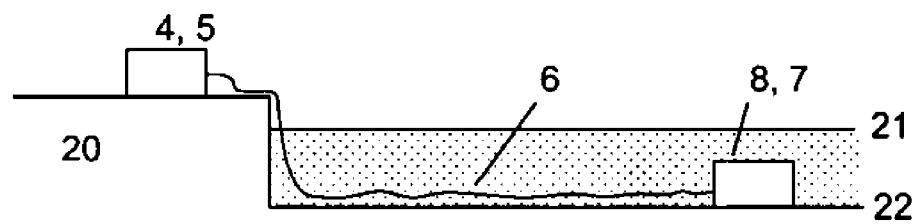
FIG. 3 shows the invention of FIG. 1 in a simplified diagram and showing in particular an arrangement of an electrical circuit according to an embodiment of the invention.

FIG. 3 shows a simple sketch of an installation for a power line between a power supply on land 20 and a machine 8 many kilometers out to sea 21. In this example the machine 8 or load is installed on the seabed 22, but the machine or load could equally as well or instead be installed underwater in some other way, or installed on a fixed or floating platform or ship of some kind. Step up transformer 5 is indicated as though it were in the same enclosure as variable speed drive 4, and the step down transformer 7 is indicated as being inside the same enclosure underwater as the machine 8 or load; however, any of the transformers may be arranged as stand-alone units or inside another enclosure.

Figure 4:
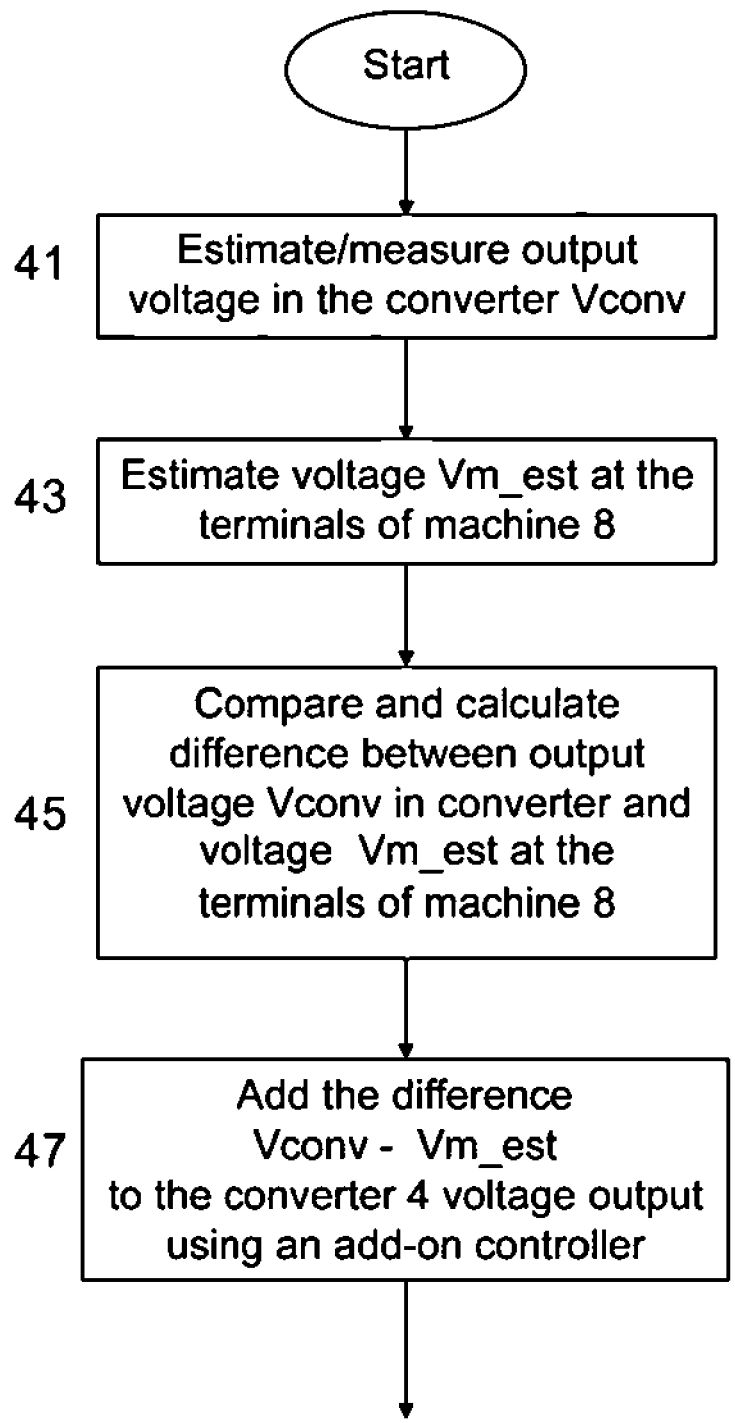
FIG. 4 shows the invention of FIG. 1 and more particularly it shows a schematic flowchart for the method according to an embodiment of the invention.

FIG. 4 is a flowchart for a method according to an embodiment. The flowchart shows a method that wherein

41. An estimate and/or measurement of output voltage Vconv is made in the drive controller or converter 4

43. An estimate is made of the voltage VM_est at the terminals of machine 8 or other electrical load

45. The values of the converter output voltage in the converter Vconv and the estimated voltage at the motor terminals Vm_est are compared and any difference found

47. The difference between the converter output voltage in the converter Vconv and the estimated voltage at the motor terminals Vm_est is added to the converter voltage output, for example by means of an add-in controller, to compensate for the estimated voltage difference.

The example described is concerned with a power supply over a long line for an installation at sea. However the invention may also be applied on land, for example with an oil or gas pipeline in a machine or an electrical load is arranged to be powered by an AC cable sufficiently long that variation in frequency/load will occur at the machine/load terminals. Thus compressor motors in pipelines can benefit from practicing an embodiment of the invention.

Derived and measured data including electrical characteristics such as resistance, inductance, capacitance of certain components, and particularly for the transformers 5, 7 and the cable 6, may be stored in a database or list. The database may be stored in a non-volatile memory storage unit of a control unit arranged in or with the drive controller. The database may be arranged as firmware.

In another preferred embodiment of the invention, the solution involves estimating (calculating) both voltage and current at the machine terminals (electrical load end) by using converter internal calculated and measured output voltage and current. The calculated current is used as feedback for current limit function in the converter 4 to prevent thermal overloading of the machine 8. This is advantageous because in a very long step-out application, the converter output current rms (root mean square) value may vary a small amount during a variation from no load to full load, and so a normal current limit of the converter current would not provide thermal protection of the machine from current overloading. In a very long step out operation converter output current output may differ from the current supplied at the load end. In this embodiment calculated motor current has been used as input for a current limiter in the motor controller (drive controller) in tests and simulations. In a preferred embodiment the converter inverter may be of the ACS 5000 type supplied by ABB.

The methods of estimating a voltage (and/or a voltage and a current) at the machine terminals as described above and elsewhere in this specification may be carried out by a computer application comprising computer program elements or software code which, when loaded in a processor or computer, causes the computer or processor to carry out the method steps. The functions of the estimator circuit may be carried out by processing digital functions, algorithms and/or computer programs and/or by analogue components or analogue circuits or by a combination of both digital and analogue functions. An estimator circuit may be comprised as a hardware or configurable hardware such as a Field-Programmable Gate Array (FPGA) or as another type of processors such as a Complex Programmable Logic Device (CPLD) or a type of Application Specific Integrated Circuit (ASIC).

The methods of the invention such as those method steps shown in FIG. 4 may, as previously described, be carried out by means of one or more computer programs comprising computer program code or software portions running on a computer or a processor. Such a processor may be arranged with a memory storage unit of a process system control unit or a motor control unit, or an add-on voltage controller or other motor control system part thereof. A part of the program or software carrying out the methods may be stored in a processor as above, but also in a ROM, RAM, PROM, EPROM or EEPROM chip or similar memory means. The program in part or in whole may also be stored on, or in, other suitable computer readable medium such as a magnetic disk, magneto-optical memory storage means, in volatile memory, in flash memory, as firmware, stored on a data server or on one or more arrays of data servers or even on removable memory media such as flash memories, hard drives etc. Data may be accessed by means of any of: OPC, OPC servers, an Object Request Broker such as COM, DCOM or CORBA, a web service, etc.

Details are given in this specification for an example based on a drive controller and in particular a power converter but the invention is not limited to this type of controlled power supply device and may be practised using other technologies such as PWM (pulse width modulation) PAM (pulse amplitude modulation) or thyristor controlled converter using a type of cascade control.

It should be noted that while the above describes exemplifying embodiments of the invention, there are several variations and modifications of controlling a machine or an electrical load supplied with AC power over a long line which may be made to the disclosed solution without departing from the scope of the present invention as defined in the appended claims.

What is claimed is:

1. A method for controlling a machine or an electrical load supplied by a drive controller over a long AC power cable, in which method said drive controller is operated to provide AC current to said load or machine at a substantially constant ratio of voltage and frequency by obtaining an estimate or measurement of a current and voltage output in said drive controller, characterized by calculating an estimated voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs=(sqrt((Umx^2)+(Umy^2)))*sqrt(3)$$

where motor or electrical load dq voltage is defined by $$Umd=Ut2d-I5d*Rt2+I5q*w*Lt2$$

$$Umq=Ut2q-I5q*Rt2-I5d*w*Lt2,$$

where $$Ut2d=Ut1d-I3d*Rcl+I3q*w*Lcl$$

$$Ut2q=Ut1q-I3q*Rcl-I3d*w*Lcl$$

are the step down transformer dq-voltages, $$I5x=I3x-I4x$$

$$I5y=I3y-I4y$$

are the motor or electrical load dq-currents, Rt2 is the step-down transformer resistance, Lt2 is the step-down transformer inductance, w is actual output electrical frequency per unit, Rcl is the cable inductance of the long AC power cable, Lcl is the cable inductance of the long AC power cable, $$Ut1d=Ucd-Icd*Rt1+Icq*w*Lt1$$

$$Ut1q=Ucq-Icq*Rt1-Icd*w*Lt1$$

are the step-up transformer output dq-voltage, $$I2d=-Ut1q*w*Ccc$$

$$I2q=Ut1d*w*Ccc$$

are the cable capacitance leakage dq-currents flowing through Ccc, the cable reactance of the long AC power cable, at the converter side, $$I3d=Icd-I2d$$

$$I3q=Icq-I2q$$

are the dq-Currents flowing through the cable inductance Lcl, $$I4d=-Ut2q*w*Ccc$$

$$I4q=Ut2d*w*Ccc$$

are the cable capacitance leakage dq-currents flowing through the cable reactance Ccc at the electrical load side, and Ucd is d-axis component of the converter voltage per unit, Icd is d-axis component of the converter current per unit, and Icq is q-axis component of the converter current per unit;

and adding a difference between the estimate and the output to control the drive controller to provide said constant ratio of voltage and frequency at the terminals of said load or machine based on the estimated voltage at the terminals.

2. The method according to claim 1, characterised by calculating the estimated current and voltage output in said drive controller based on a converter internal voltage reference to modulator as reference for dq transformation.

3. The method according to claim 1, characterised by providing the difference between the voltage estimate and the voltage output to an add-on voltage controller arranged for controlling the drive controller and compensating for the difference thus providing said constant ratio of voltage and frequency at the terminals of said machine or electrical load.

4. The method according to claim 1, characterised by calculating an estimated voltage and estimated current at the terminals at said machine or electrical load and providing one or more estimates of current at the machine terminals to a monitoring or control process of the drive controller.

5. The method according to claim 1, characterised by calculating one or more estimates of current at the machine terminals and comparing the estimated current values with predetermined current limits for the purpose of providing thermal protection of the machine or electrical load.

6. The method according to claim 1, characterised by calculating one or more estimates of current at the machine terminals and comparing the estimated current values with predetermined current limits and providing data dependent on the comparison to a control process of said drive controller for the purpose of providing thermal protection of the machine or electrical load.

7. A drive controller arranged to provide electrical power from a power supply to a machine or an electrical load, which power is supplied by said drive controller over a long AC power cable wherein AC current is provided at a substantially constant ratio of voltage and frequency to said machine or electrical load, said drive controller is arranged with an estimator circuit for estimating and/or measuring a current and voltage output in said drive controller, characterized in that said drive controller comprises a calculating circuit for calculating an estimated value for voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs = (sqrt((Umx^2)+(Umy^2)))*sqrt(3)$$

where motor or electrical load dq voltage is defined by $$Umd = Ut2d - I5d*Rt2 + I5q*w*Lt2$$

$$Umq = Ut2q - I5q*Rt2 - I5d*w*Lt2,$$

where $$Ut2d = Ut1d - I3d*Rcl + I3q*w*Lcl$$

$$Ut2q = Ut1q - I3q*Rcl - I3d*w*Lcl$$

are the step down transformer dq-voltages, $$I5x = I3x - I4x$$

$$I5y = I3y - I4y$$

are the motor or electrical load dq-currents, Rt2 is the step-down transformer resistance, Lt2 is the step-down transformer inductance, w is actual output electrical frequency per unit, Rcl is the cable inductance of the long AC power cable, Lcl is the cable inductance of the long AC power cable, $$Ut1d = Ucd - Icd*Rt1 + Icq*w*Lt1$$

$$Ut1q = Ucq - Icq*Rt1 - Icd*w*Lt1$$

are the step-up transformer output dq-voltage, $$I2d = -Ut1q*w*Ccc$$

$$I2q = Ut1d*w*Ccc$$

are the cable capacitance leakage dq-currents flowing through Ccc, the cable reactance of the long AC power cable, at the converter side, $$I3d = Icd - I2d$$

$$I3q = Icq - I2q$$

are the dq-Currents flowing through the cable inductance Lcl, $$I4d = -Ut2q*w*Ccc$$

$$I4q = Ut2d*w*Ccc$$

are the cable capacitance leakage dq-currents flowing through the cable reactance Ccc at the electrical load side, and Ucd is d-axis component of the converter voltage per unit, Icd is d-axis component of the converter current per unit, and Icq is q-axis component of the converter current per unit;

and a comparison circuit for comparing voltage output with estimated voltage at the machine terminals to identify any difference, wherein said drive controller is further adapted to carry out a compensation for the difference and control the controller output to provide said constant ratio of voltage and frequency at the terminals of said machine or electrical load based on the estimated voltage at the terminals.

8. The drive controller according to claim 7, characterized in that said estimator circuit for calculating an estimated current and voltage output in said drive controller uses a converter internal voltage reference to modulator as reference for dq transformation.

9. The drive controller according to claim 7, characterized by an add-on voltage controller provided with the difference between the output voltage in said drive controller and the estimated voltage at the terminals and arranged for controlling the drive controller based on the difference between thus providing said constant ratio of voltage and frequency at the terminals of said machine or electrical load.

10. The drive controller according to claim 7, characterized in that said estimator circuit or process for calculating an estimated voltage and current at the terminals of said machine or electrical load is arranged to provide one or more estimates of current at the machine terminals to a control or monitoring process of said drive controller.

11. The drive controller according to claim 7, characterized by an estimator circuit or process for calculating one or more estimates of current at the machine terminals and providing the estimates to a process in said drive controller for comparing one or more values for current with predetermined current limits for the purpose of providing thermal protection of the machine or electrical load.

12. The drive controller according to claim 7, characterized by an estimator circuit that comprises software or computer program code for carrying out the function of estimating the current and voltage at the terminals of the machine or electrical load supplied by said drive controller.

13. The drive controller according to claim 7, characterized by a non-volatile memory storage device on which is stored derived and measured data including electrical characteristics of any component connected to the drive controller including data from any of the transformers and/or cable.

14. A memory storage device comprising software code portions or computer code to cause a computer or processor to carry out a method for controlling a machine or an electrical load supplied by a drive controller over a long AC power cable, in which method said drive controller is operated to provide AC current to said load or machine at a substantially constant ratio of voltage and frequency by obtaining an estimate or measurement of a current and voltage output in said drive controller, characterized by calculating an estimated voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs = (sqrt((Umx^2)+(Umy^2)))*sqrt(3)$$

where motor or electrical load dq voltage is defined by $$Umd = Ut2d - I5d*Rt2 + I5q*w*Lt2$$

$$Umq = Ut2q - I5q*Rt2 - I5d*w*Lt2,$$

where $$Ut2d = Ut1d - I3d*Rcl + I3q*w*Lcl$$

$$Ut2q = Ut1q - I3q*Rcl - I3d*w*Lcl$$

are the step down transformer dq-voltages, $$I5x = I3x - I4x$$

$$I5y = I3y - I4y$$

are the motor or electrical load dq-currents, Rt2 is the step-down transformer resistance, Lt2 is the step-down transformer inductance, w is actual output electrical frequency per unit, Rd is the cable inductance of the long AC power cable, Lcl is the cable inductance of the long AC power cable, $$Ut1d = Ucd - Icd*Rt1 + Icq*w*Lt1$$

$$Ut1q = Ucq - Icq*Rt1 - Icd*w*Lt1$$

are the step-up transformer output dq-voltage, $$I2d = -Ut1q*w*Ccc$$

$$I2q = Ut1d*w*Ccc$$

are the cable capacitance leakage dq-currents flowing through Ccc, the cable reactance of the long AC power cable, at the converter side, $$I3d = Icd - I2d$$

$$I3q = Icq - I2q$$

are the dq-Currents flowing through the cable inductance Lcl, $$I4d = -Ut2q*w*Ccc$$

$$I4q = Ut2d*w*Ccc$$

are the cable capacitance leakage dq-currents flowing through the cable reactance Ccc at the electrical load side, and Ucd is d-axis component of the converter voltage per unit Icd is d-axis component of the converter current per unit, and Icq is q-axis component of the converter current per unit;

and adding a difference between the estimate and the output to control the drive controller to provide said constant ratio of voltage and frequency at the terminals of said load or machine based on the estimated voltage at the terminals.

15. A computer program comprising software code portions or computer code to cause a computer or processor to carry out the steps of a method for controlling a machine or an electrical load supplied by a drive controller over a long AC power cable, in which method said drive controller is operated to provide AC current to said load or machine at a substantially constant ratio of voltage and frequency by obtaining an estimate or measurement of a current and voltage output in said drive controller, characterized by calculating an estimated voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs = (sqrt((Umx^2) + (Umy^2)))*sqrt(3)$$

where motor or electrical load dq voltage is defined by $$Umd = Ut2d - I5d*Rt2 + I5q*w*Lt2$$

$$Umq = Ut2q - I5q*Rt2 - I5d*w*Lt2,$$

where $$Ut2d = Ut1d - I3d*Rcl + I3q*w*Lcl$$

$$Ut2q = Ut1q - I3q*Rcl - I3d*w*Lcl$$

are the steps down transformer dq-voltages, $$I5x = I3x - I4x$$

$$I5y = I3y - I4y$$

are the motor or electrical load dq-currents, Rt2 is the step-down transformer resistance, Lt2 is the step-down transformer inductance, w is actual output electrical frequency per unit, Rcl is the cable inductance of the long AC power cable, Lcl is the cable inductance of the long AC power cable, $$Ut1d = Ucd - Icd*Rt1 + Icq*w*Lt1$$

$$Ut1q = Ucq - Icq*Rt1 - Icd*w*Lt1$$

are the step-up transformer output dq-voltage, $$I2d = -Ut1q*w*Ccc$$

$$I2q = Ut1d*w*Ccc$$

are the cable capacitance leakage dq-currents flowing through Ccc, the cable reactance of the long AC power cable, at the converter side, $$I3d = Icd - I2d$$

$$I3q = Icq - I2q$$

are the dq-Currents flowing through the cable inductance Lcl, $$I4d = -Ut2q*w*Ccc$$

$$I4q = Ut2d*w*Ccc$$

are the cable capacitance leakage dq-currents flowing through the cable reactance Ccc at the electrical load side, and Ucd is d-axis component of the converter voltage per unit, Icd is d-axis component of the converter current per unit, and Icq is q-axis component of the converter current per unit;

and adding a difference between the estimate and the output to control the drive controller to provide said constant ratio of voltage and frequency at the terminals of said load or machine based on the estimated voltage at the terminals.

16. A computer program product recorded on a computer readable medium, comprising computer program code or software code portions which when read into a computer or processor will cause the computer or processor to carry out the steps of a method for controlling a machine or an electrical load supplied by a drive controller over a long AC power cable, in which method said drive controller is operated to provide AC current to said load or machine at a substantially constant ratio of voltage and frequency by obtaining an estimate or measurement of a current and voltage output in said drive controller, characterized by calculating an estimated voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs = (sqrt((Umx^2) + (Umy^2)))*sqrt(3)$$

where motor or electrical load dq voltage is defined by $$Umd = Ut2d - I5d*Rt2 + I5q*w*Lt2$$

$$Umq = Ut2q - I5q*Rt2 - I5d*w*Lt2,$$

where $$Ut2d = Ut1d - I3d*Rcl + I3q*w*Lcl$$

$$Ut2q = Ut1q - I3q*Rcl - I3d*w*Lcl$$

are the step down transformer dq-voltages, $$I5x=I3x-I4x$$

$$I5y=I3y-I4y$$

are the motor or electrical load dq-currents, Rt2 is the step-down transformer resistance, Lt2 is the step-down transformer inductance, w is actual output electrical frequency per unit, Rcl is the cable inductance of the long AC power cable, Lcl is the cable inductance of the long AC power cable, $$Ut1d=Ucd-Icd*Rt1+Icq*w*Lt1$$

$$Ut1q=Ucq-Icq*Rt1-Icd*w*Lt1$$

are the step-up transformer output dq-voltage, $$I2d=-Ut1q*w*Ccc$$

$$I2q=Ut1d*w*Ccc$$

are the cable capacitance leakage dq-currents flowing through Ccc, the cable reactance of the long AC power cable, at the converter side, $$I3d=Icd-I2d$$

$$I3q=Icq-I2q$$

are the dq-Currents flowing through the cable inductance Lcl, $$I4d=-Ut2q*w*Ccc$$

$$I4q=Ut2d*w*Ccc$$

are the cable capacitance leakage dq-currents flowing through the cable reactance Ccc at the electrical load side, and Ucd is d-axis component of the converter voltage per unit, Icd is d-axis component of the converter current per unit, and Icq is q-axis component of the converter current per unit;

and adding a difference between the estimate and the output to control the drive controller to provide said constant ratio of voltage and frequency at the terminals of said load or machine based on the estimated voltage at the terminals.

17. Use of a drive controller in an installation for production, transmission, distribution or processing of oil and/or gas, the drive controller arranged to provide electrical power from a power supply to a machine or an electrical load, which power is supplied by said drive controller over a long AC power cable wherein AC current is provided at a substantially constant ratio of voltage and frequency to said machine or electrical load, said drive controller is arranged with an estimator circuit for estimating and/or measuring a current and voltage output in said drive controller, characterized in that said drive controller comprises a calculating circuit for calculating an estimated value for voltage at the terminals of said machine or electrical load using a simplified load flow model of the drive controller, a step-up transformer, the long AC power cable, a step-down transformer and the machine, the estimated voltage being determined using dq-coordinates as a motor or electrical load absolute voltage vector $$Um\_abs=(sqrt((Umx^2)+(Umy^2)))*sqrt(3)$$

where motor or electrical load dq voltage is defined by $$Umd=Ut2d-I5d*Rt2+I5q*w*Lt2$$

$$Umq=Ut2q-I5q*Rt2-I5d*w*Lt2,$$

where $$Ut2d=Ut1d-I3d*Rcl+I3q*w*Lcl$$

$$Ut2q=Ut1q-I3q*Rcl-I3d*w*Lcl$$

are the step down transformer dq-voltages, $$I5x=I3x-I4x$$

$$I5y=I3y-I4y$$

are the motor or electrical load dq-currents, Rt2 is the step-down transformer resistance, Lt2 is the step-down transformer inductance, w is actual output electrical frequency per unit, Rcl is the cable inductance of the long AC power cable, Lcl is the cable inductance of the long AC power cable, $$Ut1d=Ucd-Icd*Rt1+Icq*w*Lt1$$

$$Ut1q=Ucq-Icq*Rt1-Icd*w*Lt1$$

are the step-up transformer output dq-voltage, $$I2d=-Ut1q*w*Ccc$$

$$I2q=Ut1d*w*Ccc$$

are the cable capacitance leakage dq-currents flowing through Ccc, the cable reactance of the long AC power cable, at the converter side, $$I3d=Icd-I2d$$

$$I3q=Icq-I2q$$

are the dq-Currents flowing through the cable inductance Lcl, $$I4d=-Ut2q*w*Ccc$$

$$I4q=Ut2d*w*Ccc$$

are the cable capacitance leakage dq-currents flowing through the cable reactance Ccc at the electrical load side, and Ucd is d-axis component of the converter voltage per unit, Icd is d-axis component of the converter current per unit, and Icq is q-axis component of the converter current per unit;

and a comparison circuit for comparing voltage output with estimated voltage at the machine terminals to identify any difference, wherein said drive controller is further adapted to carry out a compensation for the difference and control the controller output to provide said constant ratio of voltage and frequency at the terminals of said machine or electrical load based on the estimated voltage at the terminals.

\* \* \* \* \*